United States Patent
Dong et al.

(10) Patent No.: US 11,099,293 B2
(45) Date of Patent: Aug. 24, 2021

(54) SYSTEM AND METHOD FOR EVALUATING A FORMATION USING A STATISTICAL DISTRIBUTION OF FORMATION DATA

(71) Applicant: Halliburton Energy Services, Inc., Houston, TX (US)

(72) Inventors: Weixin Dong, Sugar Land, TX (US); Hsu-Hsiang Wu, Sugar Land, TX (US)

(73) Assignee: Halliburton Energy Services. Inc., Houston, TX (US)

(*) Notice: Subject to any disclaimer, the term of this patent is extended or adjusted under 35 U.S.C. 154(b) by 601 days.

(21) Appl. No.: 15/773,542

(22) PCT Filed: May 8, 2017

(86) PCT No.: PCT/US2017/031604
§ 371 (c)(1),
(2) Date: May 3, 2018

(87) PCT Pub. No.: WO2018/208281
PCT Pub. Date: Nov. 15, 2018

(65) Prior Publication Data
US 2019/0383961 A1 Dec. 19, 2019

(51) Int. Cl.
*G06G 7/48* (2006.01)
*G01V 3/38* (2006.01)
(Continued)

(52) U.S. Cl.
CPC ............ *G01V 3/38* (2013.01); *E21B 41/0092* (2013.01); *E21B 49/00* (2013.01); *G01V 3/20* (2013.01); *E21B 7/067* (2013.01)

(58) Field of Classification Search
CPC .......... G01V 3/38; G01V 3/32; G01V 99/005; G01V 1/306; G01V 3/12
See application file for complete search history.

(56) References Cited

U.S. PATENT DOCUMENTS

| 2002/0133323 A1* | 9/2002 | Dahlberg ............... G01V 11/00 703/10 |
| 2008/0130409 A1 | 6/2008 | Leggett, III et al. |

(Continued)

FOREIGN PATENT DOCUMENTS

| WO | WO02065374 A3 | 12/2002 |
| WO | 2014011190 | 1/2014 |
| WO | 2017074295 A1 | 5/2017 |

OTHER PUBLICATIONS

Mateus Goes Castro Meira Seismic Monitoring of Carbonate Reservoirs Using Stochastic Time-Lapse Inversion Thesis for Degree of Doctor of Philosophy, Western Australia School of Mines, Department of Exploration Geophysics, Curtin University, Dec. 2016 (Year: 2016).*

(Continued)

*Primary Examiner* — Rehana Perveen
*Assistant Examiner* — Cuong V Luu
(74) *Attorney, Agent, or Firm* — Chamberlain Hrdlicka

(57) ABSTRACT

A system and method of evaluating a subterranean earth formation using a statistical distribution of formation data. The system comprises a logging tool and a processor in communication with the logging tool. The logging tool comprises a sensor operable to measure formation data and is locatable in a wellbore intersecting the subterranean earth formation. The processor is operable to calculate inversion solutions to the formation data, wherein each inversion solution comprises values for a parameter of the formation, and generate a statistical distribution of the parameter along one or more depths in the subterranean earth formation using the inversion solutions. The processor is also operable to identify peaks within the statistical distribution and select the inversion solutions corresponding to the identified peaks, generate a formation model using the selected inversion (Continued)

solutions; and evaluate the formation using the formation model to identify formation layers for producing a formation fluid.

18 Claims, 5 Drawing Sheets

(51) Int. Cl.
  *E21B 41/00*     (2006.01)
  *E21B 49/00*     (2006.01)
  *G01V 3/20*      (2006.01)
  *E21B 7/06*      (2006.01)

(56) References Cited

U.S. PATENT DOCUMENTS

| | | | |
|---|---|---|---|
| 2013/0144529 A1 | 6/2013 | Seydoux et al. | |
| 2013/0226461 A1* | 8/2013 | Yu | E21B 47/00 702/9 |
| 2015/0088426 A1* | 3/2015 | Tang | E21B 47/026 702/7 |
| 2015/0145513 A1* | 5/2015 | Li | G01V 3/32 324/303 |
| 2015/0369952 A1* | 12/2015 | Wu | G01V 3/30 702/7 |
| 2016/0003973 A1* | 1/2016 | Guner | G01V 99/00 702/11 |
| 2016/0084983 A1* | 3/2016 | Wu | G01V 3/104 702/7 |
| 2017/0075021 A1* | 3/2017 | Thiel | G01V 3/20 |
| 2017/0314385 A1* | 11/2017 | Hori | E21B 17/20 |
| 2017/0322339 A1* | 11/2017 | Wessling | E21B 7/04 |
| 2018/0321413 A1* | 11/2018 | Zhong | G01V 3/18 |

OTHER PUBLICATIONS

PCT International Search Report and Written Opinion dated Dec. 8, 2017 issued in corresponding application No. PCT/US2017/031604 filed on May 8, 2017, 9 pgs.

\* cited by examiner

SYSTEM AND METHOD FOR EVALUATING A FORMATION USING A STATISTICAL DISTRIBUTION OF FORMATION DATA

BACKGROUND

This section is intended to provide relevant background information to facilitate a better understanding of the various aspects of the described embodiments. Accordingly, it should be understood that these statements are to be read in this light and not as admissions of prior art.

Petroleum drilling and production operations demand a great quantity of information relating to the parameters and conditions downhole. Such information typically includes the location and orientation of the wellbore and drilling assembly, earth formation properties, and parameters of the downhole drilling environment. The collection of information relating to formation properties and downhole conditions is commonly referred to as "logging", and can be performed during the drilling process itself (hence the term "logging while drilling" or "LWD," frequently used interchangeably with the term "measurement while drilling" or "MWD").

Various measurement tools are used in LWD applications. One such tool is the resistivity tool, which includes one or more antennas for receiving a formation response and may include one or more antennas for transmitting an electromagnetic signal into the formation. When operated at low frequencies, the resistivity tool may be called an induction tool, and at high frequencies the resistivity tool may be called an electromagnetic wave propagation tool. Though the physical phenomena that dominate the measurement may vary with frequency, the operating principles for the tool are consistent. In some cases, the amplitude and/or the phase of the received signals are compared to the amplitude and/or phase of the transmit signals to measure the formation resistivity. In other cases, the amplitude and/or phase of multiple receive signals are compared to each other to measure the formation resistivity.

A layered model-based inversion has been used in the electromagnetic resistivity logging tools to identify major boundaries between different formation resistivities. One-dimensional (1D) formation assumption is typically used in the inversion as well, where each layered boundary is parallel from one to another. Generally speaking, the typical detection range of the conventional resistivity logging tools is around 5 (1.5 meters) to 10 feet (3 meters) and the maximum detection range is around 18 feet (5.5 meters).

Ultra-deep resistivity logging tools detect formation boundaries 100 feet (30.5 meters) radially outward from the tool, which provides a much deeper detection range than conventional logging tools. Within the depth of investigation, there are usually multiple layers and a qualitative method such as correlation fails due to the complexity. A boundary mapping algorithm such as a distance-to-bed-boundary (DTBB) inversion algorithm is therefore used to interpret the tool responses qualitatively and evaluate the subterranean earth formation.

The local minima issue is a well-known problem for inversion, especially for inversion which uses deep measurements to invert for a formation model within a large depth range. Because of the large depth of investigation (DOI), there will be many different formation modes that possibly fit the measurements within a certain misfit threshold, leading to local minimum solution and/or solution ambiguity issues. To fully explore all the solution possibilities, the inversion usually starts from multiple initial guesses of the formation model to avoid sticking in one local minima, and converges to different results. To extract a formation model not only meaningful but also with high confidence from all the possible inversion result, a post-processing scheme is necessary to select the most relevant group from the inversion solutions pool.

BRIEF DESCRIPTION OF THE DRAWINGS

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
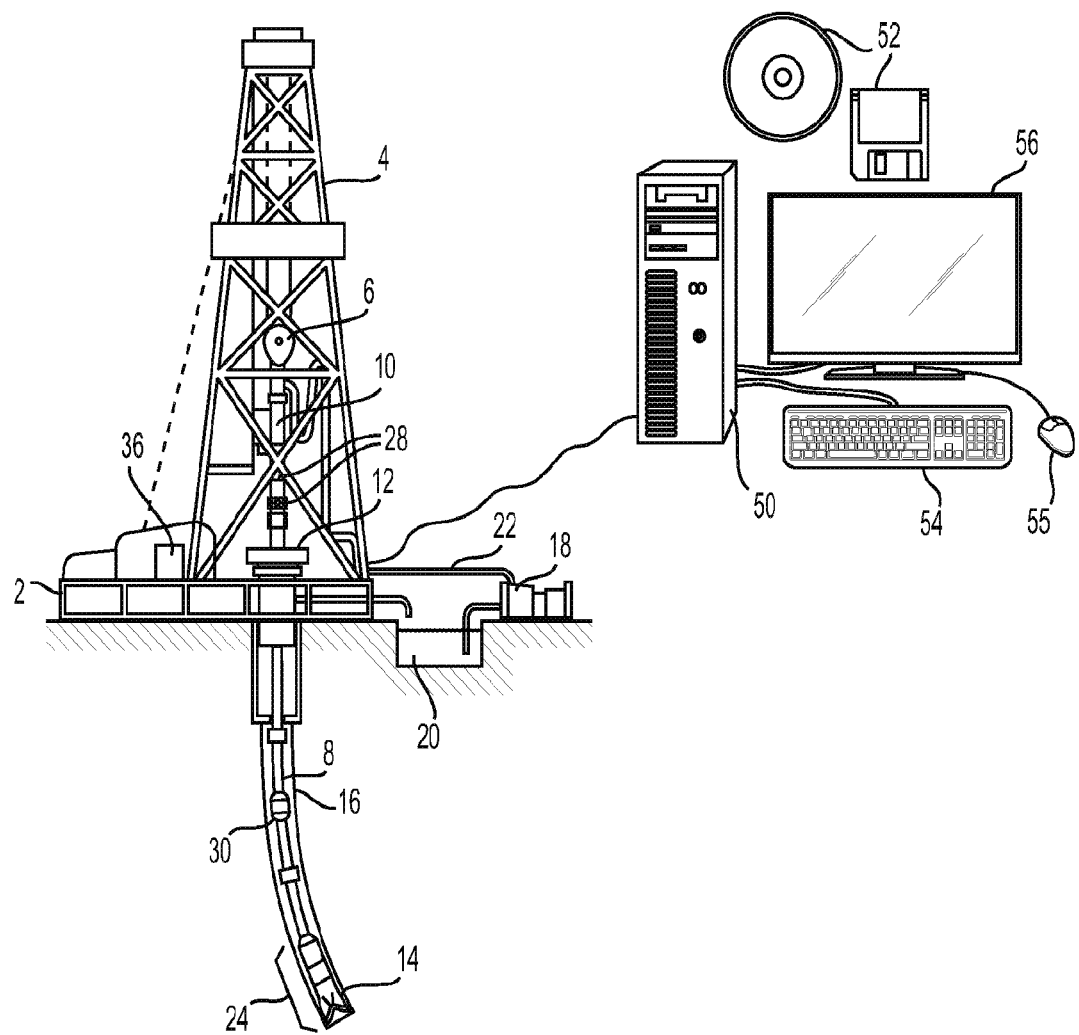
FIG. 1 depicts an elevation view of an LWD environment, according to one or more embodiments.

FIG. 1 shows one or more embodiments of an illustrative LWD environment. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a wellbore 16 that passes through various formations. A pump 18 circulates drilling fluid 20 through a feed pipe 22, through the interior of the drill string 8 to drill bit 14. The fluid exits through orifices in the drill hit 14 and flows upward through the annulus around the drill string 8 to transport drill cuttings to the surface, where the fluid is filtered and recirculated.

The drill bit 14 is just one piece of a bottom-hole assembly 24 that includes a mud motor and one or more "drill collars" (thick-walled steel pipe) that provide weight and rigidity to aid the drilling process. Some of these drill collars include built-in logging instruments to gather measurements of various drilling parameters such as location, is orientation, weight-on-bit, wellbore diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

The bottom-hole assembly 24 may include a device for measuring formation resistivity, a gamma ray device for measuring formation gamma ray intensity, devices for measuring the inclination and azimuth of the drill string 8, pressure sensors for measuring wellbore pressure, temperature sensors for measuring wellbore temperature, etc. Also included in bottom-hole assembly 24 is a telemetry sub that maintains a communications link with the surface. Mud pulse telemetry is one common telemetry technique for transferring tool measurements to surface receivers and receiving commands from the surface, but other telemetry techniques can also be used. For some techniques (e.g., through-wall acoustic signaling) the drill string 8 includes one or more repeaters 30 to detect, amplify, and re-transmit the signal. At the surface, transducers 28 convert signals between mechanical and electrical form, enabling a network interface module 36 to receive the uplink signal from the telemetry sub and (at least in some embodiments) transmit a downlink signal to the telemetry sub.

A computer system 50 located at the surface receives a digital telemetry signal, demodulates the signal, and displays the tool data or well logs to a user. Although FIG. 1 depicts the computer system 50 as being hardwired to the telemetry system, it should be appreciated that the computer system 50 may be in wireless communication with the telemetry system. The computer system 50 may include a processor and a non-transitory machine-readable medium 53 (e.g., ROM, EPROM, EEPROM, flash memory, RAM, a hard drive, a solid state disk, an optical disk, or a combination thereof) capable of executing instructions. The processor of the computer system 50 may include one or more processors located at the surface or in the wellbore, such as integrated with the bottom-hole assembly 24. Software (represented in FIG. 1 as the non-transitory machine-readable medium 52) governs the operation of the system 50. A user interacts with the system 50 and the software 52 via one or more input devices 54 and 55 and one or more output devices 56. In some system embodiments, a driller employs the system 50 to make geosteering decisions (e.g., modifying the wellbore trajectory or steering the drill bit 14) and communicate appropriate commands to the bottom-hole assembly 24 to execute those decisions. The computer system 50 is operable to perform calculations or operations to evaluate the formation, identify formation boundary positions, and/or steer the drill bit 14 as further described herein.

The drillstring shown in FIG. 1 illustrates a directional drilling operation, wherein drilling is performed along a path or trajectory other than a straight vertical path downward. In at least some illustrative embodiments, the change in direction is achieved using a "bent sub," which is a tubular section along the drillstring near the drill bit that is bent or curved. The bend or curve may be fixed or variable, with the direction of the drilling being determined either by the bend alone, or by a combination of the bend and the rotation of the drillstring. For example, if a downhole motor is used to drive the drill bit and a drillstring with a fixed bent sub is maintained at a fixed azimuthal orientation, the drill string will gradually change direction towards the direction of the bend. If instead such a drillstring is rotated, drilling will progress along a line parallel to the drillstring section above the bend and about which the drill bit processes.

For drillstrings capable of varying the angle of the bent sub, the sub is set to a desired angle and direction while the drillstring is maintained at a desired fixed azimuthal orientation, with the drill bit being driven by the downhole motor. This is sometimes referred to as "slide drilling," as the drillstring slides through the wellbore without rotating. In other drillstring embodiments, the drillstring continues to be rotated and the angle of the bent sub is maintained by applying a force on the drillstring in a specific direction. This causes the sub to be pushed into the wellbore wall opposite the desired drilling direction to create an angle between the drillstring pipes and/or bottom-hole assembly units to either side of the sub. Such systems are sometimes referred to as rotary steerable systems.

Because of the angle change introduced by the above-described subs and systems used in directional drilling, and because of the bends produced in the drillstring by the resulting wellbore, logging tool subs located along the length of the drillstring may be oriented in different directions. This is particularly true for logging tools utilized in deep formation evaluation (i.e., tools wherein a transmitter antenna is separated from a receive antenna by at least 20 feet), as the transmit and receive antennas used in such tools may be housed in logging tool subs that are separated by larger distances (compared to other logging tools) in order to achieve the desired formation penetration of the transmitted signals. The greater the distance between the logging tool subs, the greater the inclination and strike angle differences may be between drillstring sections traversing a wellbore path that is curved or otherwise not a straight line. As used herein, the inclination angle of an LWD tool sub that houses an antenna is defined as the angle between a vertical z axis and the drillstring's z axis local to said antenna. The strike angle is defined as the angle between a reference vector normal to a vertical z axis and a projection onto a horizontal x-y plane of the drillstring's z axis local to the antenna.

Figure 2:
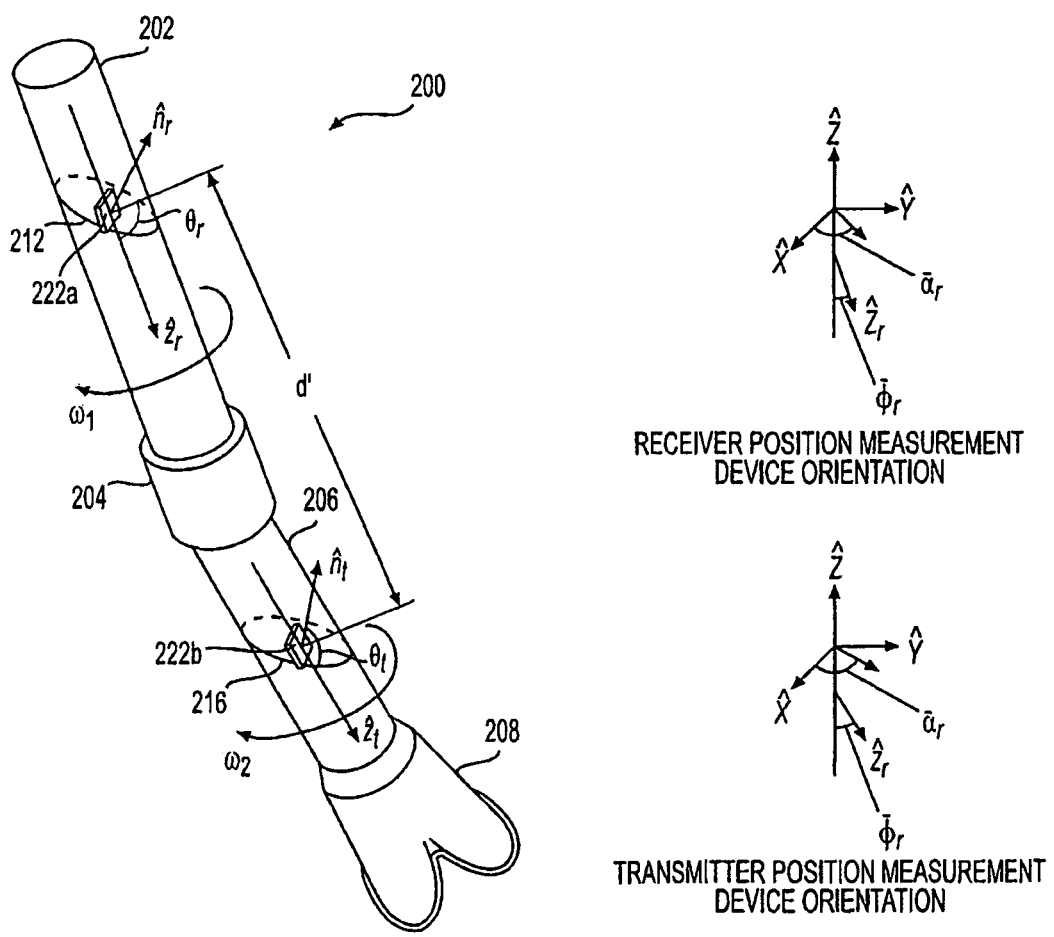
FIG. 2 depicts a schematic view of a deep resistivity logging tool, in accordance with one or more embodiments, according to one or more embodiments.

FIG. 2 shows a schematic view of a deep resistivity logging tool 200, in accordance with one or more embodiments. The resistivity logging tool 200 may be included with the bottom-hole assembly 24 of FIG. 1 and includes two LWD sensor subs 202 and 206 at different locations and orientations along a drillstring. A resistivity logging tool receive antenna 212 and a corresponding receive antenna position measurement device 222a are housed within the LWD sensor sub 202, while a resistivity logging tool transmit antenna 216 and a corresponding transmit antenna position measurement device 222b (components of an "at bit" instrument) are housed within the LWD sensor sub 206 and closer to the drill bit 208. The position measurement devices 222a, b locate the position of each corresponding antenna, which may be expressed, for example, in terms of each antenna's tilt angle ($\theta_r$ and $\theta_t$ relative to the $z_r$ and $z_t$ axes respectively; generally fixed and known), each antenna's azimuthal angle ($\alpha_r$ and $\alpha_t$ relative to the x axis), each LWD tool sub's inclination angle ($\phi_r$ and $\phi_t$), and the distance d' between the antennas. Various methods may be used to locate the antenna positions (e.g., relative to a reference position on the surface. It should be noted that although the bent sub angles are typically less than five degrees, the illustration shown has a much more pronounced angles to better illustrate the effect of the angles on the relative spatial locations of the antennas, described in more detail below.

The resistivity logging tool 200 in communication with the computer system 50 of FIG. 1 is used to measure formation data, which is in turn used to evaluate the formation and/or determine a wellbore trajectory to produce formation fluids, such as hydrocarbon fluids including oil or gas. It should be appreciated that the resistivity logging tool 200 is an exemplary tool for measuring formation data and other suitable logging tools may be used. Also, other resistivity logging tools may employ different antenna configurations to evaluate the formation.

The formation data measured may be used to generate a resistivity model of the formation and determine the uncertainty of a parameter included in or determined from the formation data. A resistivity model may be used to identify boundary positions between formation layers and determine the wellbore trajectory to produce formation fluids. The uncertainty of a parameter indicates a range of suitable values for a particular parameter such as the uncertainty of resistivity values or boundary positions of formation layers. For instance, the uncertainty of a boundary position provides an indication of where a formation boundary may be located and the extent to which that formation boundary position may vary. As used herein, the uncertainty of a parameter refers to a range of suitable values for the parameter or a measure that is used to quantify a variation in the parameter (e.g., standard deviation). The parameter may include any one or any combination of a horizontal resistivity, vertical resistivity, conductivity, an anisotropy ratio, a boundary position of formation layers, and a formation dip.

Figure 3:
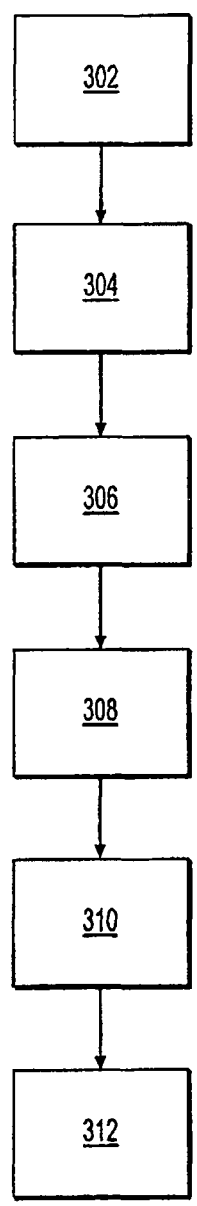
FIG. 3 depicts a flowchart view of a method a method to generate a formation model using formation data measured from the resistivity logging tool of FIG. 2, according to one or more embodiments.

FIG. 3 shows a flow chart of a method 300 to generate a formation model using formation data measured from the resistivity logging tool 200 of FIG. 2, in accordance with one or more embodiments. At block 302, the formation data is used to generate DTBB solutions using a DTBB inversion method. The inversion solutions may include any one or any combination of one-dimensional, two-dimensional, or three-dimensional inversion solutions. At block 304, the DTBB solutions are filtered to yield the DTBB solutions that fit best to the measured formation data. At block 306, a statistical distribution of a formation parameter (e.g., a histogram of the formation boundary positions) is generated along one or more depths of the subterranean earth formation to further filter the inversion solutions based on trends identified in the statistical distribution. At block 308, one or more peaks within the statistical distribution are identified to find the dominant trends in the statistical distribution, and the inversion solutions corresponding to the peaks are selected for further processing. At block 310, a formation model is generated using the selected inversion solutions to efficiently summarize the inversion solutions. At block 312, the formation model may be used to evaluate the formation to identify formation layers suitable for producing formation fluids, such as a hydrocarbon fluid. The formation model may also be used to develop a wellbore trajectory or steer the drill bit through or towards a formation zone suitable for producing formation fluids.

As a non-limiting example for block 302, to generate a resistivity model of the formation, multiple guesses are applied to a DTBB inversion method to provide multiple DTBB solutions that best fit to the measured formation data. The DTBB inversions are run with multiple random initial guesses with one or more formation layers. At block 304, after inversion, the DTBB solutions, which may include several hundred solutions, are identified by the extent of the misfit with the measured formation data. The DTBB solutions that satisfy a threshold (e.g., a minimal residual solution) may be identified for further processing. The DTBB solutions that fit best with the formation measurements are selected as the final solutions. The DTBB inversion and solution selection process is done repeatedly on each logging point or measurement depth of the resistivity logging tool to provide a summarized resistivity model based on the identified inversion solutions.

Figure 4:
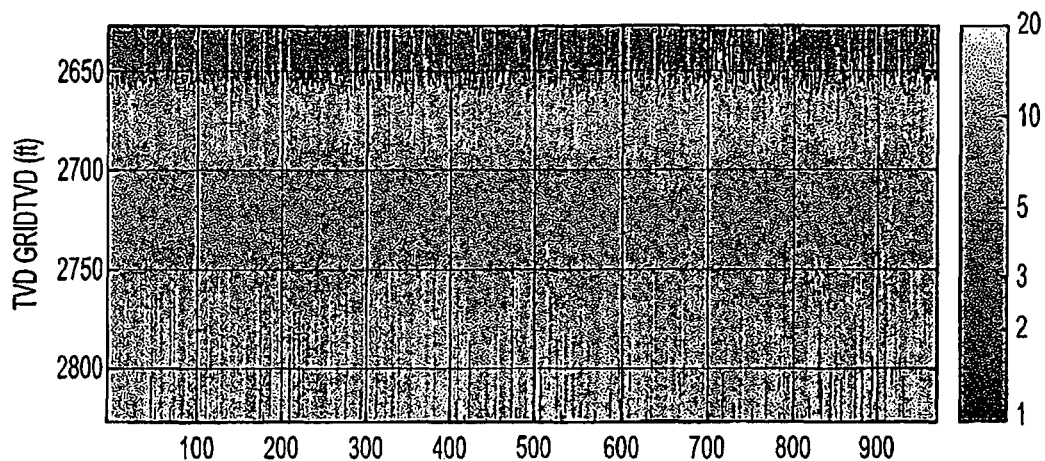
FIG. 4 depicts a graph view of inversion solutions to formation data, according to one or more embodiments.

For example, FIG. 4 shows a graph view of the identified inversion solutions, which satisfy a certain misfit threshold relative to measured formation data, according to one or more embodiments. The inversion solutions in the graph satisfy a certain misfit threshold relative to formation data measured using the resistivity logging tool 200. As shown, each vertical stripe in the graph depicts the horizontal resistivity ($R_h$, ohm·m) as function of true vertical depth (TVD) and is an inversion solution for the same measurement depth taken using the resistivity logging tool. The horizontal resistivity value ($R_h$, ohm·m) is depicted using a contour scale according to the scale to the right of the graph. As there are almost one thousand inversion solutions for the same measurement depth, FIG. 4 demonstrates the problem of evaluating the inversion solutions arising from measuring formation data using the deep resistivity logging tool 200— namely the problem of evaluating a data set comprising hundreds of inversion solutions.

Referring to FIG. 3 at block 306, a statistical distribution of a formation parameter may be used to identify dominant trends among the inversion solutions and further filter the inversion solutions to generate a formation model as described in more detail below. The statistical distribution of a formation parameter may be generated using the inversion solutions identified at block 304. For example, the statistical distribution may be a histogram of a formation parameter among the identified solutions with respect to a true vertical depth. At block 308, once the statistical distribution is generated, one or more peaks may be identified in the histogram, and the inversion solutions corresponding to the peaks may be selected for further processing to generate a formation model as described in more detail below.

As a non-limiting example, a histogram of formation boundary positions is generated using the identified inversion solutions. To generate the histogram, the formation boundary positions among the inversion solutions are determined, and the frequency of each boundary position is counted at each true vertical depth (TVD). A formation boundary position may refer to a TVD where the difference between adjacent horizontal resistivities exceeds a threshold resistivity. A formation boundary position may also refer to a TVD where two different formation layers intersect (e.g., the boundary position between shale and sand). It should also be appreciated that the histogram used to filter inversion solutions may be generated based on the frequency of other suitable formation parameters, including but not limited to horizontal resistivity, vertical resistivity, conductivity, anisotropy ratio, and/or formation dip. As used herein, the term "histogram" may refer to a representation of a frequency distribution by means of rectangles whose widths represent class intervals (e.g., boundary positions at TVDs) and whose areas are proportional to the corresponding frequencies. The term "statistical distribution" may refer to the underlying data, which is used to graphically represent a histogram, including but not limited to the class intervals (e.g., boundary positions at TVDs or other suitable formation parameters at TVDs) and the frequencies corresponding to the class intervals.

Figure 5:
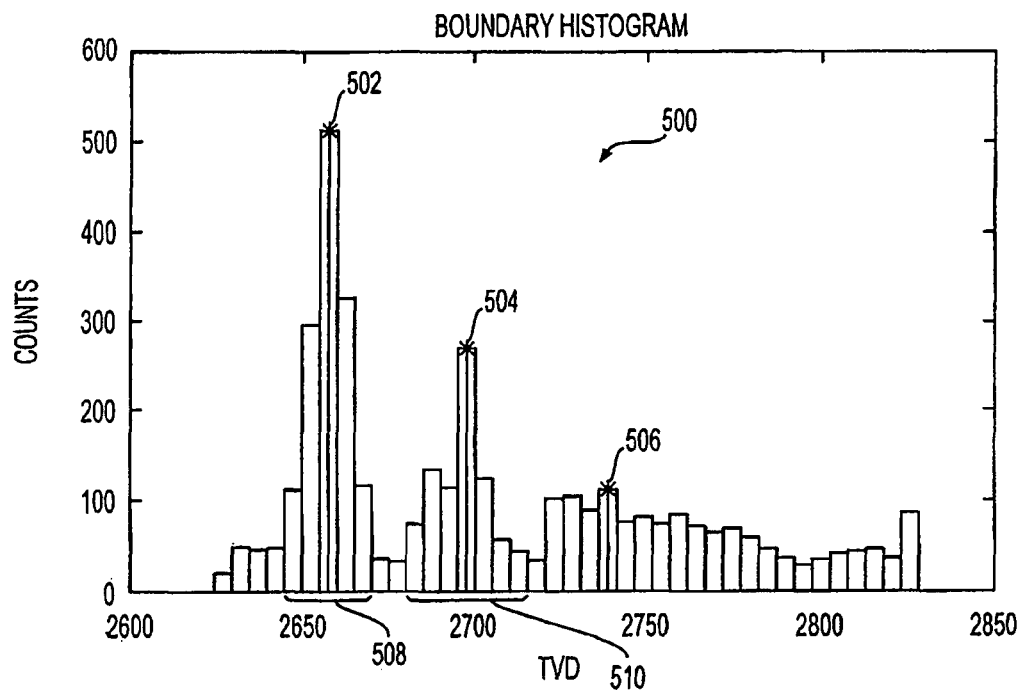
FIG. 5 depicts a graph view of a histogram of formation boundary positions, according to one or more embodiments.

FIG. 5 shows a graph view of an exemplary histogram 500 of formation boundary positions, according to one or more embodiments. The histogram 500 depicts the frequency of boundary positions determined at TVDs among the inversion solutions identified at block 304. As shown, three peaks 502, 504, 506 correspond to prominent boundary positions among the inversion solutions. The peaks 502,

504, 506 (e.g., local maxima) within the histogram may be identified, and the inversion solutions corresponding to the identified peaks 502, 504, 506 may be selected for further processing.

The peaks within the histogram indicate dominant trends for potential formation boundary positions in the formation. The peaks may be identified by finding the boundary position frequencies that exceed or satisfy a threshold value relative to adjacent boundary position frequencies. For example, the peak 502 may be identified based on its frequency value (about 500) exceeding a threshold (e.g., 10-30% increase) relative to the frequencies (about 300) adjacent to the peak 502. As shown, the peak 502 increases in frequency by about 60% compared to the adjacent boundary frequencies. This increase in frequency for the peak 502 relative to its adjacent frequencies satisfies the threshold, which may be used to identify peak 502.

The uncertainty of a formation boundary position can also be identified by the width 508, 510 of a peak found in the histogram 500 (FIG. 5). The boundary position uncertainty includes but is not limited to the full peak width or a value less than the full width of the peak (e.g., a half width). If the mean horizontal resistivity includes sharp contrasts in resistivity, the boundary uncertainty may be relatively small as the inversion solutions indicate the same or similar boundary positions. On the other hand, if the mean horizontal resistivity changes gradually, the boundary uncertainty may be large indicating a large variation in the boundary position among the inversion solutions. The uncertainty of a parameter indicates a range of suitable values for a particular parameter such as the uncertainty of boundary position. For instance, the uncertainty of a boundary position provides an indication of where a formation position boundary may be located and the extent to which that formation boundary position may vary. As used herein, the uncertainty of a parameter refers to a range of suitable values for the parameter or a measure that is used to quantify a variation in the parameter (e.g., standard deviation).

It should be appreciated that the histogram 500 is merely an exemplary graphical representation of the underlying measurement data used to identify trends among the inversion solutions. A statistical distribution comprising the class intervals and the frequencies corresponding to the class intervals used to generate a histogram may also be used to identify the peaks, peak widths, and inversion solutions corresponding to the identified peaks as previously discussed.

Once the inversion solutions corresponding to the peaks are selected, a formation model may be generated using the selected inversion solutions to evaluate the formation, determine a wellbore trajectory for a drill bit, and/or steer the drill bit to a particular location of interest identified in the formation model. The formation model may indicate formation layers or zones that are suitable for producing formation fluids, such as a hydrocarbon fluid. As such, the wellbore trajectory for the drill bit may be designed to advance the drill bit through a hydrocarbon producing zone. The drill bit may be steered using the formation model to stay within bed boundaries for the hydrocarbon producing zone.

At block 310, a model average scheme of the formation data may be used to summarize the results characterized by inversion solutions filtered with the histogram. A mathematical mean, including algebraic, geometric or harmonic mean:

$$H = \frac{1}{n\sum\limits_{i=1}^{n} x_i}, H = \left(\prod\limits_{i=1}^{n} x_i\right)^{1/n}, \frac{1}{H} = 1/n\sum\limits_{i=1}^{n} 1/x_i$$

may be applied to the selected solutions to calculate the formation model, where H is the mean value and $\{x_i\}$ are the parameter values for the selected solutions for a particular measurement depth. The various mathematical means provide different interpretations of the formation model. For example, the algebraic mean calculates the mean of the resistivity in ohm-m directly. The geometric mean calculates the mean on a logarithmic scale of resistivity. The harmonic mean calculates the mean of the conductivity and then converts the mean conductivity to resistivity. For an induction based resistivity LWD tool, the harmonic mean is usually used because the tool is sensitive to conductivity instead of resistivity. Therefore, an area with large conductivity may be highlighted when calculating the mean from the measurements of an induction logging tool.

Figure 6:
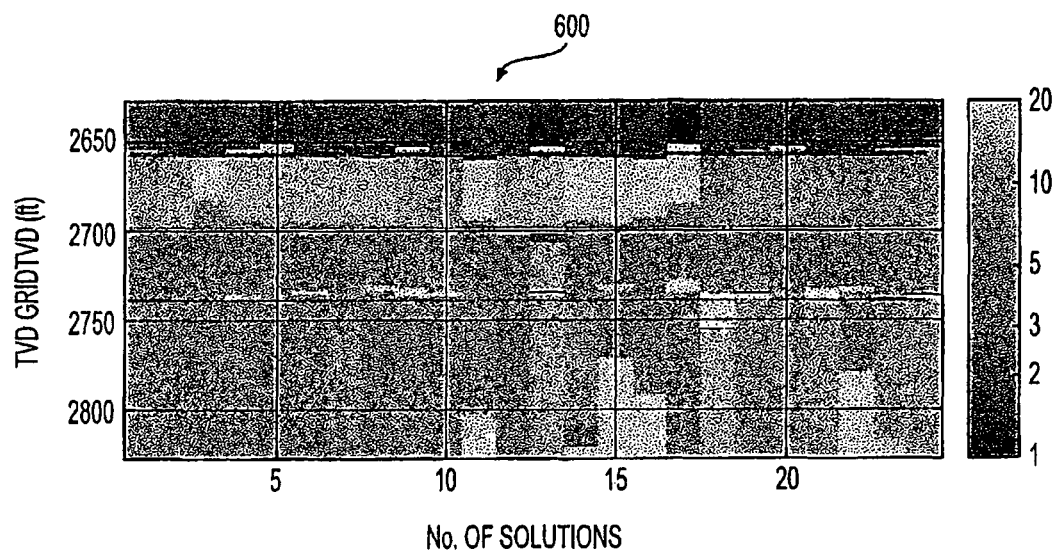
FIG. 6 depicts a graph view of the mean horizontal resistivity models calculated using the inversion solutions filtered with the histogram of FIG. 5, according to one or more embodiments.

FIG. 6 shows a graph view of the mean horizontal resistivity models 600 calculated using the inversion solutions filtered with the histogram of FIG. 5, in accordance with one or more embodiments. Each vertical stripe of the resistivity model 600 is a resistivity model corresponding to the number of inversion solution(s) (x-axis) used to calculate the mean. Each vertical stripe of the resistivity models 600 also shows the mean horizontal resistivity as a function of true vertical depth (y-axis) with the resistivity scale to the right of the graph. The resistivity models 600 show the mean resistivity models calculated for the same measurement depth. Therefore, the leftmost resistivity model is the resistivity model based on a single inversion solution selected using the histogram, and the rightmost resistivity model is the mean resistivity based on thirty inversion solutions selected using the same histogram. FIG. 6 demonstrates that the mean resistivity value may vary based on the number of inversion solutions selected for calculation. FIG. 6 also demonstrates that all the resistivity models 600 identified a boundary position proximate to the TVD value of 2650 ft (808 m).

Figure 7:
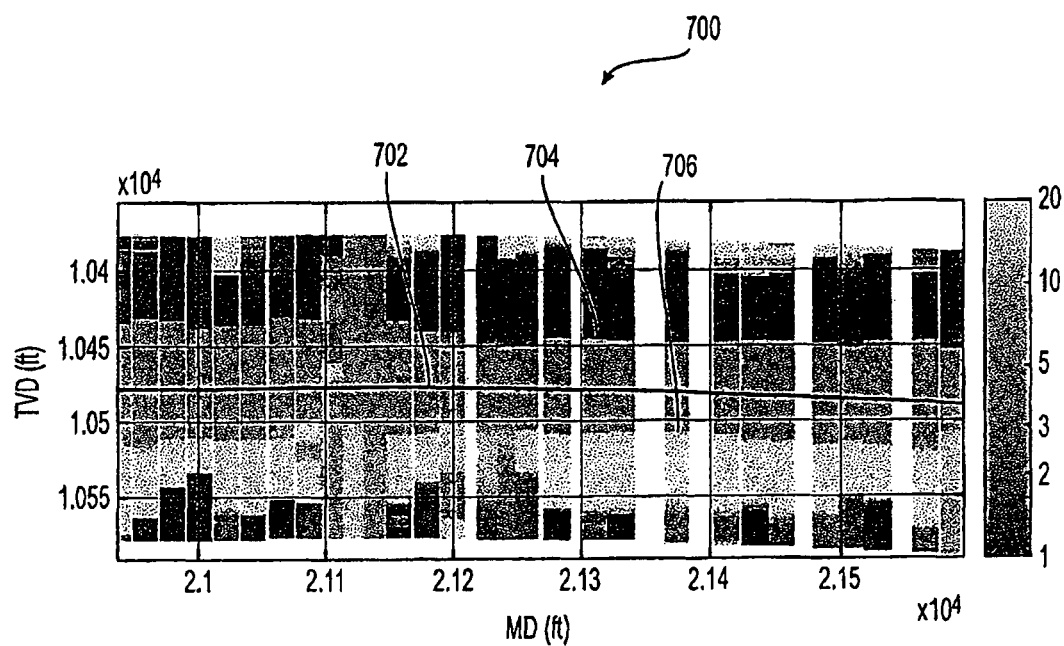
FIG. 7 depicts a graph view of a resistivity model with respect to measurement depth, according to one or more embodiments.

FIG. 7 shows a graph view of a resistivity model 700 with respect to measurement depth (x-axis), in accordance with one or more embodiments. As shown, for each measurement depth, a mean resistivity model is calculated using the inversion solutions filtered from a histogram. The resistivity model 700 combines the mean resistivity models calculated at each measurement depth using the inversion solutions filtered with a respective histogram, and thus, each measurement depth represents the mean resistivity model resulting from performing blocks 302-310 of FIG. 3. Each vertical stripe shows the formation resistivity as a function of true vertical depth (y-axis) for a particular measurement depth (x-axis). The resistivity model 700 is shown as a contour plot of resistivity with the resistivity scale depicted to the right of the graph.

As shown, contrasts in resistivity (704 and 706) represent formation boundary positions between formation layers comprising different formation properties, such as shale, limestone, sandstone, gas-bearing sandstone, oil-bearing limestone, etc. The boundary positions of the formation layers identified in the formation model 700 can be used to steer the drill bit towards a suitable formation layer or identify the wellbore trajectory 702 to penetrate one or more formation layers for production, such as formation layers suitable for production of formation fluids. For instance, the wellbore trajectory 402 may be identified to advance predominantly between formation boundary positions identified based on the contrasts in resistivity 704 and 706.

At block 312, the boundary positions, which are identified using the various graphs (FIGS. 3-7) or averaged inversion solutions filtered using a histogram as previously discussed, may also be used to evaluate the formation, identify a wellbore trajectory, and/or steer a drill bit (e.g., the drill bit 14 of FIG. 1) through or toward a formation layer suitable for producing formation fluids. For example, a formation layer suitable for producing formation fluids may exist between the peaks 502 and 504 depicted in FIG. 5. In addition to the peaks 502 and 504 indicating the location of boundary positions, the uncertainty of the boundary positions are indicated by the widths 508, 510 of the peaks 502 and 504. The peak widths 508, 510 indicate the range of TVDs where the boundary positions may exist as well. A drill bit may be steered or a wellbore trajectory may be developed to pass between the peak widths of peaks 502 and 504.

It should be appreciated that the system and methods described herein provide a solution particular to inversion methods used to determine formation properties from deep resistivity logging tools. Inversion methods using formation data from deep resistivity logging tools can provide hundreds of solutions at a single measurement depth of the resistivity logging tool. The method and system described herein filters the inversion solutions using a histogram to identify dominant trends among the inversion solutions and summarizes the filtered inversion solutions to evaluate the formation, identify a wellbore trajectory, and/or steer a drill bit for producing formation fluids.

In addition to the embodiments described above, many examples of specific combinations are within the scope of the disclosure, some of which are detailed below:

Example 1

A system for evaluating a subterranean earth formation, comprising:
  a logging tool comprising a sensor operable to measure formation data and locatable in a wellbore intersecting the subterranean earth formation;
  a processor in communication with the logging tool and operable to:
    calculate inversion solutions to the formation data, wherein each inversion solution comprises values for a parameter of the formation,
    generate a statistical distribution of the parameter along one or more depths in the subterranean earth formation using the inversion solutions,
    identify peaks within the statistical distribution and select the inversion solutions corresponding to the identified peaks,
    generate a formation model using the selected inversion solutions; and
    evaluate the formation using the formation model to identify formation layers for producing a formation fluid.

Example 2

The system of example 1, wherein the logging tool comprises a resistivity logging tool operable to measure the resistivity of the formation.

Example 3

The system of example 1, wherein the processor is further operable to generate the formation model by calculating a mean of parameter values included in the selected solutions for a measurement depth of the logging tool.

Example 4

The system of example 1, wherein the parameter includes any one or any combination of horizontal resistivity, vertical resistivity, conductivity, anisotropy ratio, boundary position of formation layers, and a formation dip.

Example 5

The system of example 1, wherein the statistical distribution comprises a histogram of the parameter, wherein the processor is further operable to generate the histogram by determining formation boundary positions among the inversion solutions and determining the frequency of formation boundary positions at each true vertical depth.

Example 6

The system of example 1, wherein the processor is further operable to determine the uncertainty of a parameter based on the statistical distribution by identifying the width of a peak in the statistical distribution.

Example 7

The system of example 1, wherein the inversion solutions comprise any one or any combination of a one-dimensional, a two-dimensional, or a three-dimensional inversion solution.

Example 8

The system of example 1, wherein the processor is further operable to select inversion solutions that satisfy a misfit threshold relative to the formation data for generating the statistical distribution.

Example 9

The system of example 1, wherein the processor is further operable to calculate the inversion solutions for formation data measured at a particular wellbore depth.

Example 10

The system of example 1, wherein the processor is further operable to identify peaks within the statistical distribution based on a parameter frequency exceeding a threshold relative to an adjacent parameter frequency.

Example 11

A method of evaluating a subterranean earth formation, comprising:
  calculating inversion solutions to formation data measured with a sensor of a logging tool located in a wellbore intersecting the formation, wherein the inversion solutions comprise values for a parameter of the formation,
  generating a statistical distribution of the parameter along one or more depths in the subterranean earth formation using the inversion solutions,
  identifying peaks within the statistical distribution and selecting the inversion solutions corresponding to the identified peaks,
  generating a formation model using the selected inversion solutions, and evaluating the formation model to identify a formation layer to produce formation fluids.

Example 12

The method of example 11, wherein the logging tool comprises a resistivity logging tool operable to measure the resistivity of the formation.

Example 13

The method of example 11, wherein the formation model is generated by calculating a mean of parameter values included in the selected solutions for a measurement depth of the logging tool.

Example 14

The method of example 11, wherein the parameter includes any one or any combination of horizontal resistivity, vertical resistivity, conductivity, anisotropy ratio, boundary position of formation layers, and formation dip.

Example 15

The method of example 11, wherein the statistical distribution comprises a histogram of the parameter, and wherein generating the histogram comprises determining formation boundary positions among the inversion solutions and determining the frequency of formation boundary positions at each true vertical depth.

Example 16

The method of example 11, further comprising determining the uncertainty of a parameter based on the statistical distribution of formation boundary positions.

Example 17

The method of example 11, wherein generating the statistical distribution comprises selecting inversion solutions that satisfy a misfit threshold relative to the formation data for generating the statistical distribution.

Example 18

The method of example 11, wherein identifying the peaks comprises identifying the peaks based on a parameter frequency in the statistical distribution exceeding a threshold value relative to an adjacent parameter frequency.

Example 19

A method of steering a drill bit in a subterranean earth formation, comprising:
calculating inversion solutions to formation data measured with a logging tool
comprising sensors and located in a wellbore intersecting the formation, generating a statistical distribution of a parameter of the formation along one or more depths in the subterranean earth formation using the inversion solutions, identifying peaks within the statistical distribution and selecting the inversion solutions corresponding to the identified peaks, calculating a mean of the parameter values included in the selected solutions for a measurement depth of the logging tool to generate a formation model, and steering the drill bit through a formation layer identified using the formation model.

Example 20

The method of example 19, wherein the logging tool comprises a resistivity logging tool operable to measure the resistivity of the formation; and the parameter includes any one or any combination of horizontal resistivity, vertical resistivity, conductivity, anisotropy ratio, boundary position of formation layers, and a formation dip.

This discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A system for evaluating a subterranean earth formation, comprising:

a logging tool comprising a sensor operable to measure formation data and locatable in a wellbore intersecting the subterranean earth formation; and a processor in communication with the logging tool and operable to:

calculate distance to bed boundary (DTBB) inversion solutions to the formation data using a DTBB inversion method, wherein each DTBB inversion solution comprises values for a parameter of the formation, generate a statistical distribution of the parameter along one or more depths in the subterranean earth formation using the DTBB inversion solutions that satisfy a misfit threshold relative to the formation data for generating the statistical distribution, identify peaks within the statistical distribution and select the DTBB inversion solutions corresponding to the identified peaks, generate a formation model using the selected DTBB inversion solutions, and evaluate the formation using the formation model to identify formation layers for producing a formation fluid.

2. The system of claim 1, wherein the logging tool comprises a resistivity logging tool operable to measure the resistivity of the formation.

3. The system of claim 1, wherein the processor is further operable to generate the formation model by calculating a mean of parameter values included in the selected DTBB inversion solutions for a measurement depth of the logging tool.

4. The system of claim 1, wherein the parameter includes any one or any combination of horizontal resistivity, vertical resistivity, conductivity, anisotropy ratio, boundary position of formation layers, and a formation dip.

5. The system of claim 1, wherein the statistical distribution comprises a histogram of the parameter, wherein the processor is further operable to generate the histogram by determining formation boundary positions among the DTBB inversion solutions and determining the frequency of formation boundary positions at each true vertical depth.

6. The system of claim 1, wherein the processor is further operable to determine the uncertainty of a parameter based on the statistical distribution by identifying the width of a peak in the statistical distribution.

7. The system of claim 1, wherein the DTBB inversion solutions comprise any one or any combination of a one-dimensional, a two-dimensional, or a three-dimensional inversion solution.

8. The system of claim 1, wherein the processor is further operable to calculate the DTBB inversion solutions for formation data measured at a particular wellbore depth.

9. The system of claim 1, wherein the processor is further operable to identify peaks within the statistical distribution based on a parameter frequency exceeding a threshold relative to an adjacent parameter frequency.

10. A method of evaluating a subterranean earth formation, comprising:

calculating distance to bed boundary (DTBB) inversion solutions to formation data measured with a sensor of a logging tool located in a wellbore intersecting the formation using a DTBB inversion method, wherein the DTBB inversion solutions comprise values for a parameter of the formation;

generating a statistical distribution of the parameter along one or more depths in the subterranean earth formation using the DTBB inversion solutions that satisfy a misfit threshold relative to the formation data for generating the statistical distribution;

identifying peaks within the statistical distribution and selecting the DTBB inversion solutions corresponding to the identified peaks;

generating a formation model using the selected DTBB inversion solutions; and evaluating the formation model to identify a formation layer to produce formation fluids.

11. The method of claim 10, wherein the logging tool comprises a resistivity logging tool operable to measure the resistivity of the formation.

12. The method of claim 10, wherein the formation model is generated by calculating a mean of parameter values included in the selected DTBB solutions for a measurement depth of the logging tool.

13. The method of claim 10, wherein the parameter includes any one or any combination of horizontal resistivity, vertical resistivity, conductivity, anisotropy ratio, boundary position of formation layers, and formation dip.

14. The method of claim 10, wherein the statistical distribution comprises a histogram of the parameter, and wherein generating the histogram comprises determining formation boundary positions among the DTBB inversion solutions and determining the frequency of formation boundary positions at each true vertical depth.

15. The method of claim 10, further comprising determining the uncertainty of a parameter based on the statistical distribution of formation boundary positions.

16. The method of claim 10, wherein identifying the peaks comprises identifying the peaks based on a parameter frequency in the statistical distribution exceeding a threshold value relative to an adjacent parameter frequency.

17. A method of steering a drill bit in a subterranean earth formation, comprising:

calculating distance to bed boundary (DTBB) inversion solutions to formation data measured with a logging tool comprising sensors and located in a wellbore intersecting the formation using a DTBB inversion method, wherein the DTBB inversion solutions comprise values for a parameter of the formation;

generating a statistical distribution of a parameter of the formation along one or more depths in the subterranean earth formation using the DTBB inversion solutions that satisfy a misfit threshold relative to the formation data for generating the statistical distribution;

identifying peaks within the statistical distribution and selecting the DTBB inversion solutions corresponding to the identified peaks;

calculating a mean of the parameter values included in the selected DTBB solutions for a measurement depth of the logging tool to generate a formation mode; and steering the drill bit through a formation layer identified using the formation model.

18. The method of claim 17, wherein the logging tool comprises a resistivity logging tool operable to measure the resistivity of the formation; and the parameter includes any one or any combination of horizontal resistivity, vertical resistivity, conductivity, anisotropy ratio, boundary position of formation layers, and a formation dip.

* * * * *